United States Patent
Liu et al.

(10) Patent No.: US 11,693,274 B2
(45) Date of Patent: Jul. 4, 2023

(54) BACKLIGHT MODULE AND DISPLAY APPARATUS

(71) Applicant: Nano Precision Taiwan Limited, Hsinchu County (TW)

(72) Inventors: Kuan-Wen Liu, Hsinchu County (TW); Hao-Jan Kuo, Hsinchu County (TW); Ming-Yu Chou, Hsinchu County (TW); Hsin Huang, Hsinchu County (TW)

(73) Assignee: Nano Precision Taiwan Limited, Hsinchu County (TW)

( * ) Notice: Subject to any disclaimer, the term of this patent is extended or adjusted under 35 U.S.C. 154(b) by 0 days.

(21) Appl. No.: 17/584,388

(22) Filed: Jan. 26, 2022

(65) Prior Publication Data
US 2022/0269132 A1 Aug. 25, 2022

(30) Foreign Application Priority Data

Feb. 20, 2021 (CN) .......................... 202120383263.0
Jul. 8, 2021 (CN) .......................... 202121547426.0

(51) Int. Cl.
*G02F 1/13357* (2006.01)
*G02F 1/1335* (2006.01)
*F21V 8/00* (2006.01)

(52) U.S. Cl.
CPC ..... *G02F 1/133607* (2021.01); *G02B 6/0053* (2013.01)

(58) Field of Classification Search
CPC ..... G02B 6/005; G02B 6/0051; G02B 6/0053
See application file for complete search history.

(56) References Cited

U.S. PATENT DOCUMENTS

| 6,027,220 A * | 2/2000 | Arai ..................... G02B 6/0056 362/617 |
| 2016/0054507 A1* | 2/2016 | Hirayama ........... G02B 6/0091 362/607 |
| 2020/0116921 A1* | 4/2020 | Hattori ................. G02B 6/0055 |
| 2020/0233145 A1* | 7/2020 | Yagi ..................... G02B 6/0036 |

FOREIGN PATENT DOCUMENTS

| CN | 106707377 | 5/2017 |
| CN | 108732811 | 11/2018 |

* cited by examiner

*Primary Examiner* — Julie A Bannan
(74) *Attorney, Agent, or Firm* — JCIPRNET

(57) ABSTRACT

A backlight module includes a light guide plate, a light source, an optical film, and a prism sheet. The optical film includes a first substrate having opposite first and second surfaces and multiple optical microstructures disposed on the second surface and each having a first light receiving surface away from a light incident surface. The prism sheet is located on a side of the second surface of the first substrate. The prism sheet includes a second substrate having opposite third and fourth surfaces and multiple prism structures disposed on the fourth surface and each having a second light receiving surface away from the light incident surface. A first angle between the first light receiving surface and the second surface is different from a second angle between the second light receiving surface and the fourth surface. A display apparatus includes the backlight module and a display panel.

19 Claims, 13 Drawing Sheets

BACKLIGHT MODULE AND DISPLAY APPARATUS

CROSS-REFERENCE TO RELATED APPLICATION

This application claims the priority benefits of Chinese application no. 202120383263.0, filed on Feb. 20, 2021 and Chinese application no. 202121547426.0, filed on Jul. 8, 2021. The entirety of each of the above-mentioned patent applications is hereby incorporated by reference herein and made a part of this specification.

BACKGROUND

Technical Field

The disclosure relates to an optical module and a display apparatus, and particularly relates to a backlight module and a display apparatus.

Description of Related Art

With broadening application of non-self-luminous displays such as liquid crystal displays, design of a backlight module also requires to be adjusted for different purposes. In order to increase light energy utilization rate of a light source, a backlight module equipped with an optical brightness enhancement film (BEF) and a reflector has become one of mainstreams on the market. Generally speaking, such a backlight module is equipped with a stacked structure of a prism sheet and two diffusers, which guide light beams emitted at a large angle from a light guide plate toward a specific angle range covering the normal viewing angle, to increase light-emitting intensity of the backlight module near the normal viewing angle. Although light incident from a specific angle into the diffusers can be scattered to increase a ratio of light emitted in the normal direction, insufficiency in directivity of the emitted light is also likely to be caused. As a result, light emitting brightness of such a backlight module near the normal viewing angle cannot be maximized.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a backlight module exhibiting obviously different light collection properties in two directions orthogonal to each other.

The disclosure provides a display apparatus compliant with the TCO 08 (TCO Certified, generation 8, for displays) standard.

To achieve one, some, or all of the above objectives or other objectives, an embodiment of the disclosure provides a backlight module. The backlight module includes a light guide plate, a light source, an optical film, and a prism sheet. The light guide plate has a light incident surface and a light emitting surface connected to the light incident surface. The light source is disposed on a side of the light incident surface of the light guide plate. The optical film is overlapped with the light emitting surface of the light guide plate, and includes a first substrate and a plurality of optical microstructures. The first substrate has a first surface and a second surface opposite to each other. The first surface faces the light emitting surface of the light guide plate. The plurality of optical microstructures are disposed on the second surface of the first substrate, and each has a fifth surface away from the light incident surface. A first angle is present between the fifth surface and the second surface. The prism sheet is overlapped with the optical film, and is located on a side of the second surface of the first substrate. The prism sheet includes a second substrate and a plurality of prism structures. The second substrate has a third surface and a fourth surface opposite to each other. The third surface faces the optical film. The plurality of prism structures are disposed on the fourth surface of the second substrate, and each has a sixth surface away from the light incident surface. A second angle is present between the sixth surface and the fourth surface, and the second angle is different from the first angle.

To achieve one, some, or all of the above objectives or other objectives, an embodiment of the disclosure provides a display apparatus. The display apparatus includes a backlight module and a display panel. The backlight module includes a light guide plate, a light source, an optical film, and a prism sheet. The light guide plate has a light incident surface and a light emitting surface connected to the light incident surface. The light source is disposed on a side of the light incident surface of the light guide plate. The optical film is overlapped with the light emitting surface of the light guide plate, and includes a first substrate and a plurality of optical microstructures. The first substrate has a first surface and a second surface opposite to each other. The first surface faces the light emitting surface of the light guide plate. The plurality of optical microstructures are disposed on the second surface of the first substrate, and each has a fifth surface away from the light incident surface. A first angle is present between the fifth surface and the second surface. The prism sheet is overlapped with the optical film, and is located on a side of the second surface of the first substrate. The prism sheet includes a second substrate and a plurality of prism structures. The second substrate has a third surface and a fourth surface opposite to each other. The third surface faces the optical film. The plurality of prism structures are disposed on the fourth surface of the second substrate, and each has a sixth surface away from the light incident surface. A second angle is present between the sixth surface and the fourth surface, and the second angle is different from the first angle. The display panel is overlapped with the light emitting surface of the light guide plate, and is located on a side of the fourth surface of the prism sheet.

Based on the foregoing, in the backlight module according to an embodiment of the disclosure, the optical film is disposed between the prism sheet and the light guide plate. The angle between the surface of the optical microstructure of the optical film and the surface of the first substrate is different from the angle between the surface of the prism structure of the prism sheet and the surface of the second substrate. Accordingly, the light collection of the backlight module in the direction perpendicular to the light incident surface of the light guide plate can be increased, and the viewing angle range of the display apparatus in the extension direction of the optical microstructures can be increased.

Other objectives, features and advantages of the present invention will be further understood from the further technological features disclosed by the embodiments of the present invention wherein there are shown and described preferred embodiments of this invention, simply by way of illustration of modes best suited to carry out the invention.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
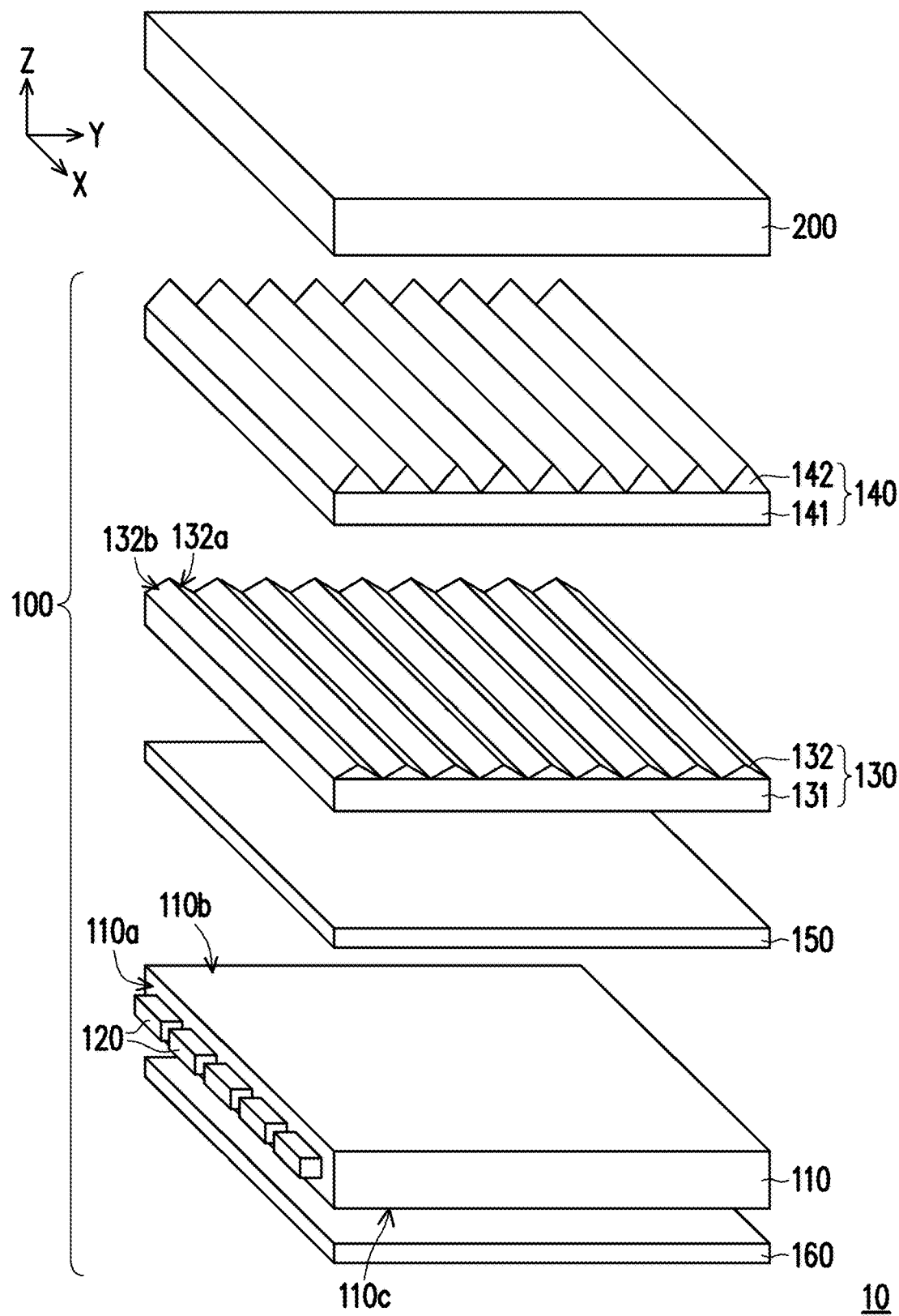
FIG. 1 is a schematic view of a display apparatus according to a first embodiment of the disclosure.
Figure 2:
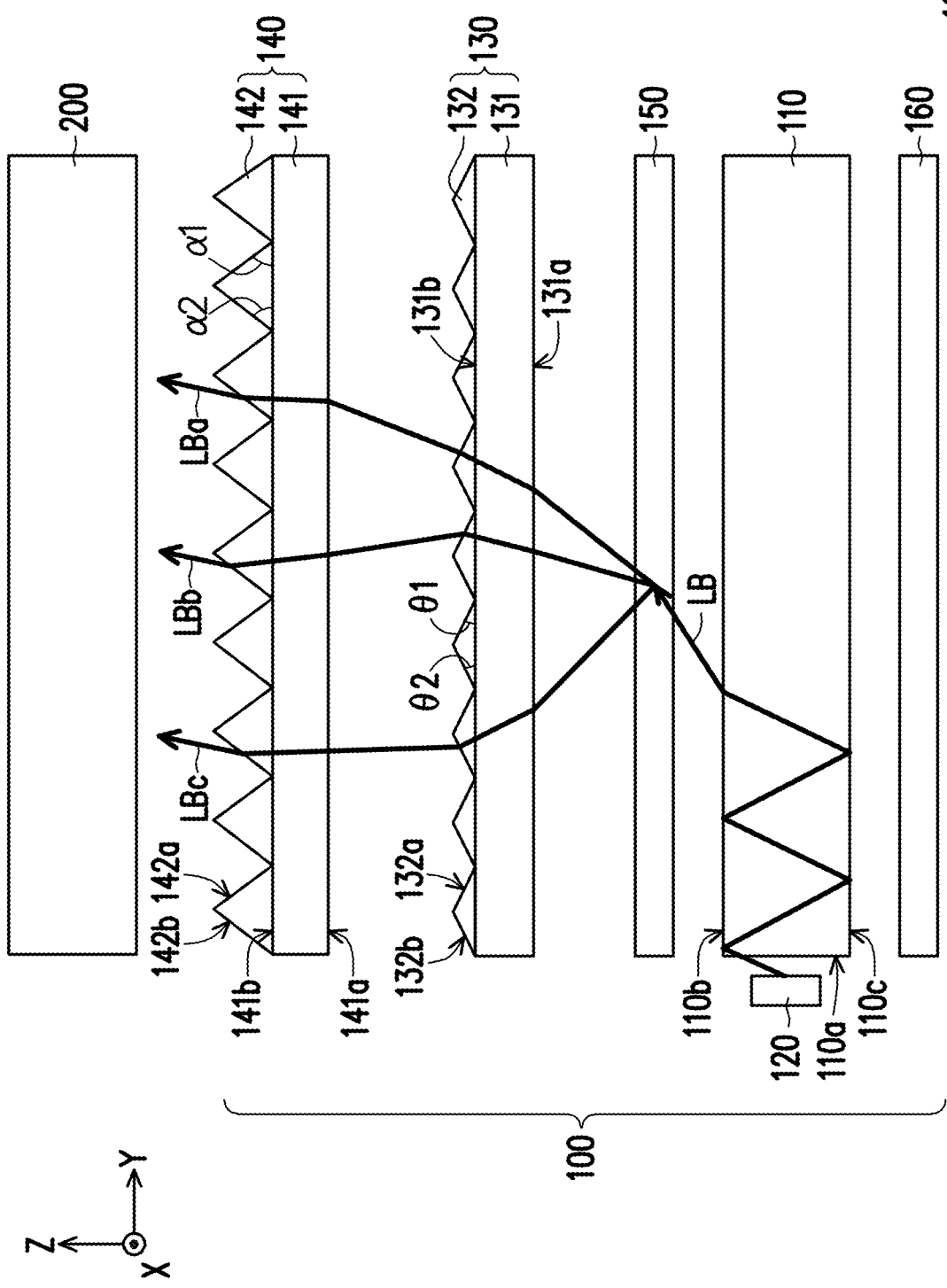
FIG. 2 is a schematic side view of the display apparatus of FIG. 1.
Figure 3B:
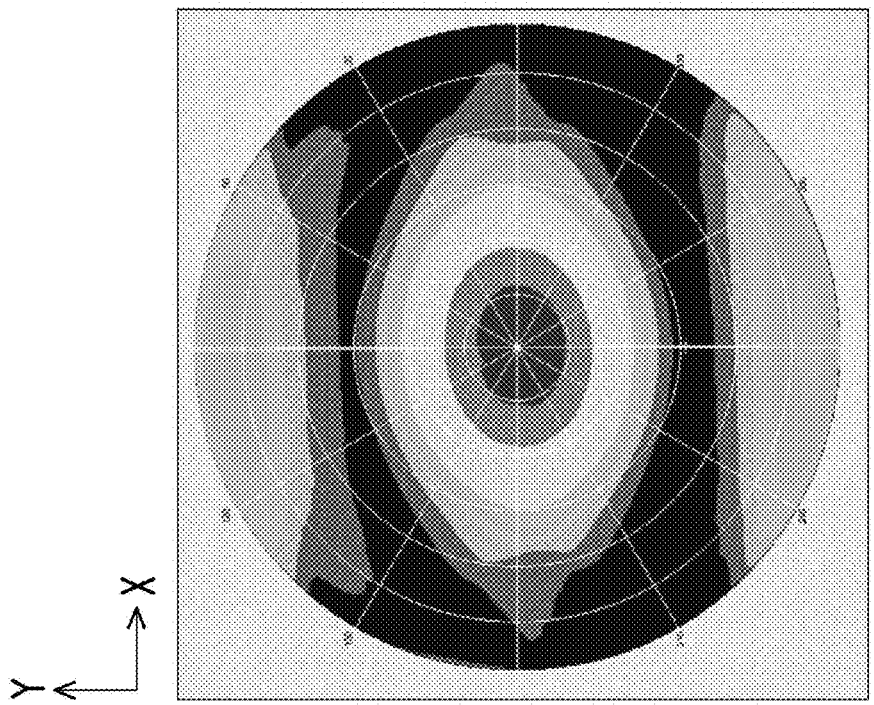
FIG. 3A and FIG. 3B are respectively graphs showing brightness distributions of the backlight module of FIG. 1 and a backlight module according to a comparative example.
Figure 3A:
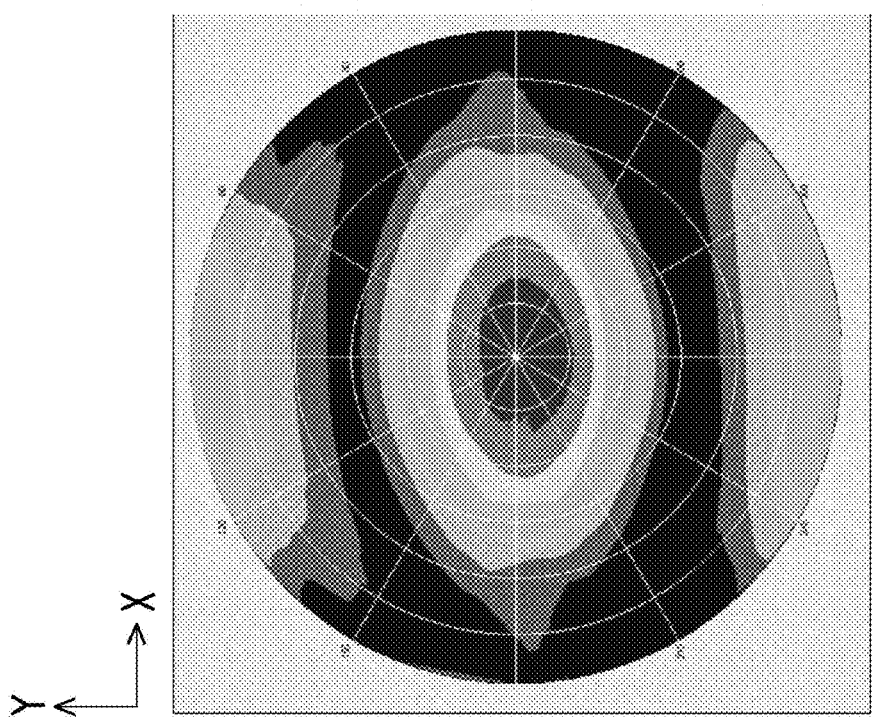
Figure 4:
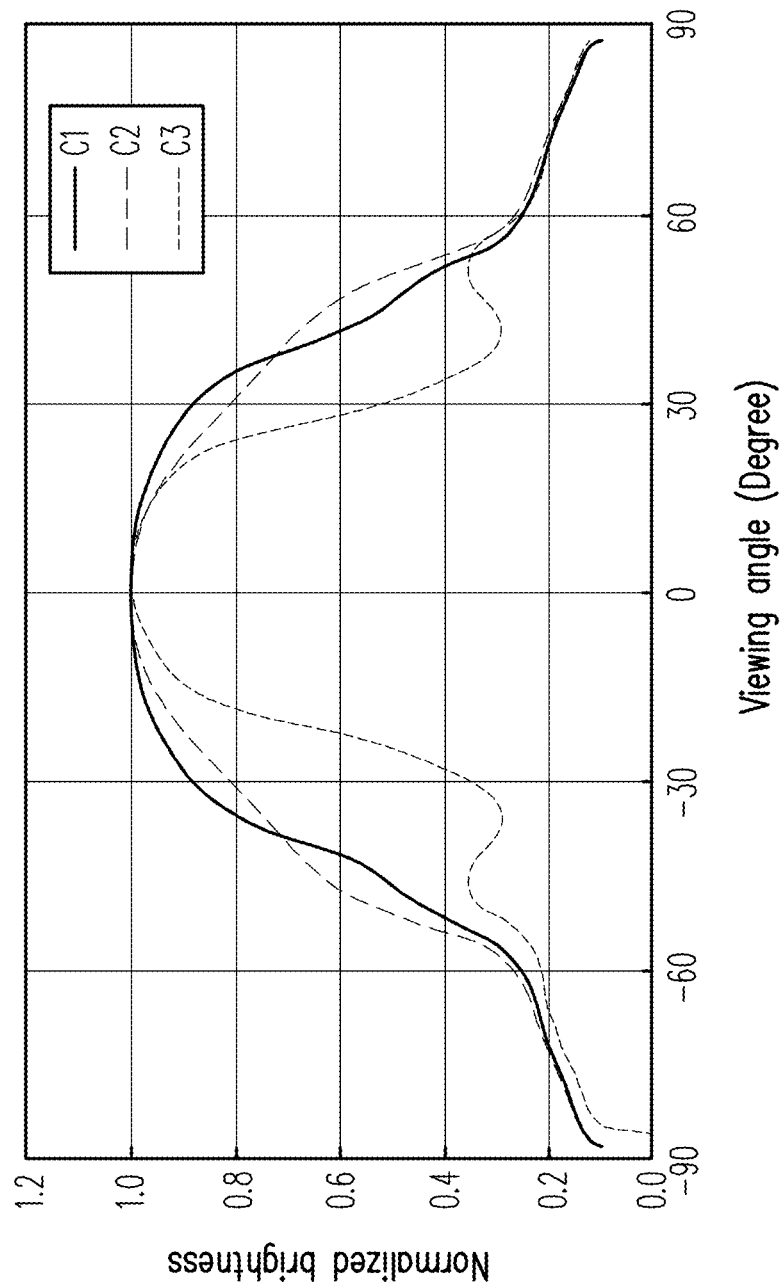
FIG. 4 is a curve chart showing the viewing angle in the horizontal direction vs. the normalized brightness of the backlight module of FIG. 1 and backlight modules according to two comparative examples.

FIG. 1 is a schematic view of a display apparatus according to a first embodiment of the disclosure. FIG. 2 is a schematic side view of the display apparatus of FIG. 1. FIG. 3A and FIG. 3B are respectively graphs showing brightness distributions of the backlight module of FIG. 1 and a backlight module according to a comparative example. FIG. 4 is a curve chart showing the viewing angle in the horizontal direction vs. the normalized brightness of the backlight module of FIG. 1 and backlight modules according to two comparative examples.

With reference to FIG. 1 and FIG. 2, a display apparatus 10 includes a backlight module 100 and a display panel 200. The display panel 200 is overlapped with the backlight module 100. In this embodiment, the display panel 200 is, for example, a liquid crystal display (LCD) panel, an electrophoretic display (EPD) panel, or other non-self-luminous display panels. In addition, a light beam LB from the backlight module 100 is converted into an image light beam after passing through the display panel 200 and is transmitted to eyes of a user to form a display image.

The backlight module 100 includes a light guide plate 110, a light source 120, and an optical film 130. The light guide plate 110 has a light incident surface 110a and a light emitting surface 110b. The light incident surface 110a and the light emitting surface 110b are connected to each other. The light source 120 is disposed on a side of the light incident surface 110a of the light guide plate 110. The optical film 130 is overlapped with the light emitting surface 110b of the light guide plate 110. In other words, the backlight module 100 of this embodiment is a laterally incident backlight module. It should be noted that in this embodiment, the number of light sources 120 are exemplified by taking five light sources as an example for description, but the disclosure is not intended to be limited to the content disclosed in the drawings. In other embodiments, the configuration quantity of light sources 120 may be adjusted depending on the optical design of the backlight module.

The optical film 130 includes a substrate 131 and a plurality of optical microstructures 132. The substrate 131 has a first surface 131a and a second surface 131b opposite to each other. The first surface 131a faces the light emitting surface 110b of the light guide plate 110. The optical microstructures 132 are disposed on the second surface 131b of the substrate 131. That is, the optical microstructures 132 are located on the side of the substrate 131 away from the light guide plate 110. For example, in this embodiment, the optical microstructures 132 are arranged along direction Y and extended in direction X. More specifically, in this embodiment, an extension direction of the optical microstructures 132 may be selectively parallel to the light incident surface 110a of the light guide plate 110, but the disclosure is not limited thereto. In other embodiments, the optical microstructures of the optical film may also intersect the light incident surface 110a of the light guide plate 110.

Further, the backlight module 100 also includes a prism sheet 140, which is overlapped with the optical film 130. The prism sheet 140 is located between the optical film 130 and the display panel 200. The prism sheet 140 has a substrate 141 and a plurality of prism structures 142. The substrate 141 has a third surface 141a and a fourth surface 141b opposite to each other. The third surface 141a faces the optical film 130. The prism structures 142 are disposed on the fourth surface 141b of the substrate 141.

In this embodiment, the prism structures 142 of the prism sheet 140 are arranged along direction Y and extended in direction X. More specifically, an extension direction of the prism structures 142 of the prism sheet 140 may be parallel to the light incident surface 110a of the light guide plate 110, but the disclosure is not limited thereto. In other embodiments, the extension direction of the prism structures of the prism sheet may be neither parallel nor perpendicular to the light incident surface 110a of the light guide plate 110.

It is worth mentioning that, in this embodiment, since the extension direction of the optical microstructures 132 of the optical film 130 is parallel to the extension direction of the prism structures 142 of the prism sheet 140, the light collection in direction Y of the backlight module 100 is greater than the light collection in direction X.

In this embodiment, the material of the substrate 131 of the optical film 130 and the material of the substrate 141 of the prism sheet 140 may include polyethylene terephthalate (PET) and polycarbonate (PC). The material of the optical microstructures 132 of the optical film 130 and the material of the prism structures 142 of the prism sheet 140 may include UV glue or other suitable polymers.

Furthermore, the optical microstructure 132 of the optical film 130 has a surface 132a being relatively away from the light incident surface 110a of the light guide plate 110 and a surface 132b being connected to the surface 132a and relatively close to the light incident surface 110a of the light guide plate 110. An angle $\theta1$ is present between the surface 132a and the second surface 131b of the substrate 131, and an angle $\theta2$ is present between the surface 132b and the second surface 131b of the substrate 131. In this embodiment, the angle $\theta1$ of the surface 132a is substantially equal to the angle $\theta2$ of the surface 132b. In other words, contour of a cross section of the optical microstructure 132 of the optical film 130 is an equilateral triangle, but the disclosure is not limited thereto. In the optical microstructure 132 of this embodiment, the angle $\theta1$ of the surface 132a and the angle $\theta2$ of the surface 132b are, for example but not limited to, 22 degrees.

With the angle $\theta1$ between the surface 132a of the optical microstructure 132 and the second surface 131b being less than 35 degrees and greater than 0 degrees, the light beam from the light guide plate 110 can be incident into the prism sheet 140 at an appropriate angle to prevent the light beam from being reflected by the prism sheet 140 back into the light guide plate 110, helping to increase the light collection of the backlight module 100.

On the other hand, the prism structure 142 of the prism sheet 140 has a surface 142a being relatively away from the light incident surface 110a of the light guide plate 110 and a surface 142b being connected to the surface 142a and relatively close to the light incident surface 110a of the light guide plate 110. An angle $\alpha1$ is present between the surface 142a and the fourth surface 141b of the substrate 141, and an angle $\alpha2$ is present between the surface 142b and the fourth surface 141b of the substrate 141. It should be noted that, in the prism structure 142 of the prism sheet 140, the angle $\alpha1$ of the surface 142a is substantially equal to the angle $\alpha2$ of the surface 142b, but is different from the angle $\theta1$ of the surface 132a of the optical microstructure 132 of the optical film 130. In this embodiment, the angle $\theta1$ of the surface 132a of the optical microstructure 132 may be less than the angle $\alpha1$ of the surface 142a of the prism structure 142.

In this embodiment, the backlight module 100 may also include a diffuser 150, which is overlapped with the light emitting surface 110b of the light guide plate 110 and with the optical film 130, and is located between the optical film 130 and the light guide plate 110. To be specific, the light beam LB from the light guide plate 110 after being incident into the diffuser 150 may be scattered into multiple light beams at each azimuth, for example, a light beam LBa, a light beam LBb, and a light beam LBc on the YZ plane. These light beams may be incident into the prism sheet 140 at an appropriate angle after passing through the optical film 130, thereby increasing the overall brightness of the backlight module 100 near the normal viewing angle. Differently, another part of light beam scattered by the diffuser 150 on the XZ plane cannot be effectively collected within the normal viewing angle after passing through the optical film 130. Therefore, the backlight module 100 can have a greater viewing angle range in direction X.

In other words, with the combination of the optical film 130, the prism sheet 140, and the diffuser 150, the light collection of the backlight module 100 in the direction (e.g., direction Y) perpendicular to the light incident surface 110a of the light guide plate 110 can be effectively increased, and the viewing angle range of the display apparatus 10 in the extension direction (e.g., direction X) of the optical microstructures 132 can be increased.

FIG. 3A and FIG. 3B are respectively graphs showing the brightness distributions of the backlight module 100 of this embodiment and a backlight module of a first comparative example. The difference between the backlight module (not shown) of the first comparative example and the backlight module 100 of this embodiment lies in that, in the backlight module of the first comparative example, another diffuser replaces the optical film 130 of the backlight module 100 of this embodiment. In other words, the backlight module of the first comparative example has two diffusers and one prism sheet 140, and the two diffusers are located between the prism sheet 140 and the light guide plate 110. With reference to FIG. 4 together, in the horizontal direction (or direction X of FIG. 1), the viewing angle range of the backlight module 100 of this embodiment exhibiting a greater brightness (as shown by curve C1 in FIG. 4) is obviously greater than the viewing angle range of the backlight module of the first comparative example exhibiting a greater brightness (as shown by curve C2 of FIG. 4). Herein, the greater brightness refers to, for example, a normalized brightness value greater than 0.8 as shown in FIG. 4.

According to FIG. 3A and FIG. 3B, for both of the backlight module 100 of this embodiment and the backlight module of the first comparative example, the light collection in the vertical direction (or direction Y of FIG. 1) is greater than the light collection in the horizontal direction (or direction X of FIG. 1). In other words, for the backlight module 100 of this embodiment and the backlight module of the first comparative example, a ratio of the light beam from the light guide plate 110 collected within the vertical viewing angle range can be increased, thus increasing the vertical viewing angle range exhibiting a high-brightness output.

It is worth noting that in this embodiment, by utilizing the optical film 130 to replace one of the diffusers of the first comparative example, the light collection of the backlight module 100 of this embodiment in the vertical direction can be greater than the light collection of the backlight module of the first comparative example, as shown in FIG. 3A and FIG. 3B. Therefore, compared with the backlight module of the first comparative example, a brightness gain of the backlight module 100 of this embodiment in the normal viewing angle direction can reach 1.27.

In particular, FIG. 4 also shows curve C3 of the viewing angle vs. the normalized brightness of the backlight module of a second comparative example. The difference between the backlight module (not shown) of the second comparative example and the backlight module 100 of this embodiment lies in that, in the backlight module of the second comparative example, another prism sheet replaces the optical film 130 of the backlight module 100 of this embodiment. In other words, the backlight module of the second comparative example has two prism sheets and the diffuser 150, and extension directions of prism structures of the two prism sheets are perpendicular to each other.

Compared with the backlight module 100 of this embodiment and the backlight module of the first comparative example, the backlight module of the second comparative example has the optimal light collection in whichever of horizontal direction (as shown by curve C3 of FIG. 4) and vertical direction, and also has a greater brightness performance at the normal viewing angle. However, the viewing angle range thereof is therefore less. As such, it cannot be compliant with the viewing angle standard of the current TCO 8.0. For example, when a display apparatus is operated in a landscape mode and horizontally rotated along a vertical axis to a horizontal viewing angle of ±30 degrees, a ratio of the maximum brightness to the minimum brightness at the left and right sides of the display screen is required to be less than 1.73; similarly, when the display apparatus is operated in the landscape mode and vertically rotated along a horizontal axis to a vertical viewing angle of ±15 degrees, a ratio of the maximum brightness to the minimum brightness at the upper and lower sides of the display screen is also required to be less than 1.73.

From another point of view, although the backlight module of the first comparative example can be compliant with the viewing angle standard of the current TCO 8.0, a normal viewing angle brightness thereof is significantly less than a normal viewing angle brightness of the backlight module of the second comparative example (with a decrease by more than 8%). Nonetheless, under compliance with the viewing angle standard of the current TCO 8.0, a normal viewing angle brightness of the backlight module 100 of this embodiment is merely slightly less than the normal viewing angle brightness of the backlight module of the second comparative example. In other words, compared with the backlight module of the first comparative example, under compliance with the viewing angle standard of the current TCO 8.0, the backlight module 100 of this embodiment also provides a greater normal viewing angle brightness.

Further, the backlight module 100 may also include a reflector 160, which is disposed on a side of a bottom surface 110c of the light guide plate 110. In addition, the bottom surface 110c is connected to the light incident surface 110a and opposite to the light emitting surface 110b. In this embodiment, the reflector 160 is, for example, a silver reflector or a white reflector, and is configured to reflect a light beam emitted from the bottom surface 110c of the light guide plate 110 back into the light guide plate 110 to increase the light energy utilization rate of the light source 120.

Other embodiments of the present disclosure will be described in detail below, where the same members will be denoted by the same reference numerals, and the description of the same technical contents will be omitted. For the omitted part, reference may be made to the above embodiment, and will not be repeatedly described below.

Figure 5:
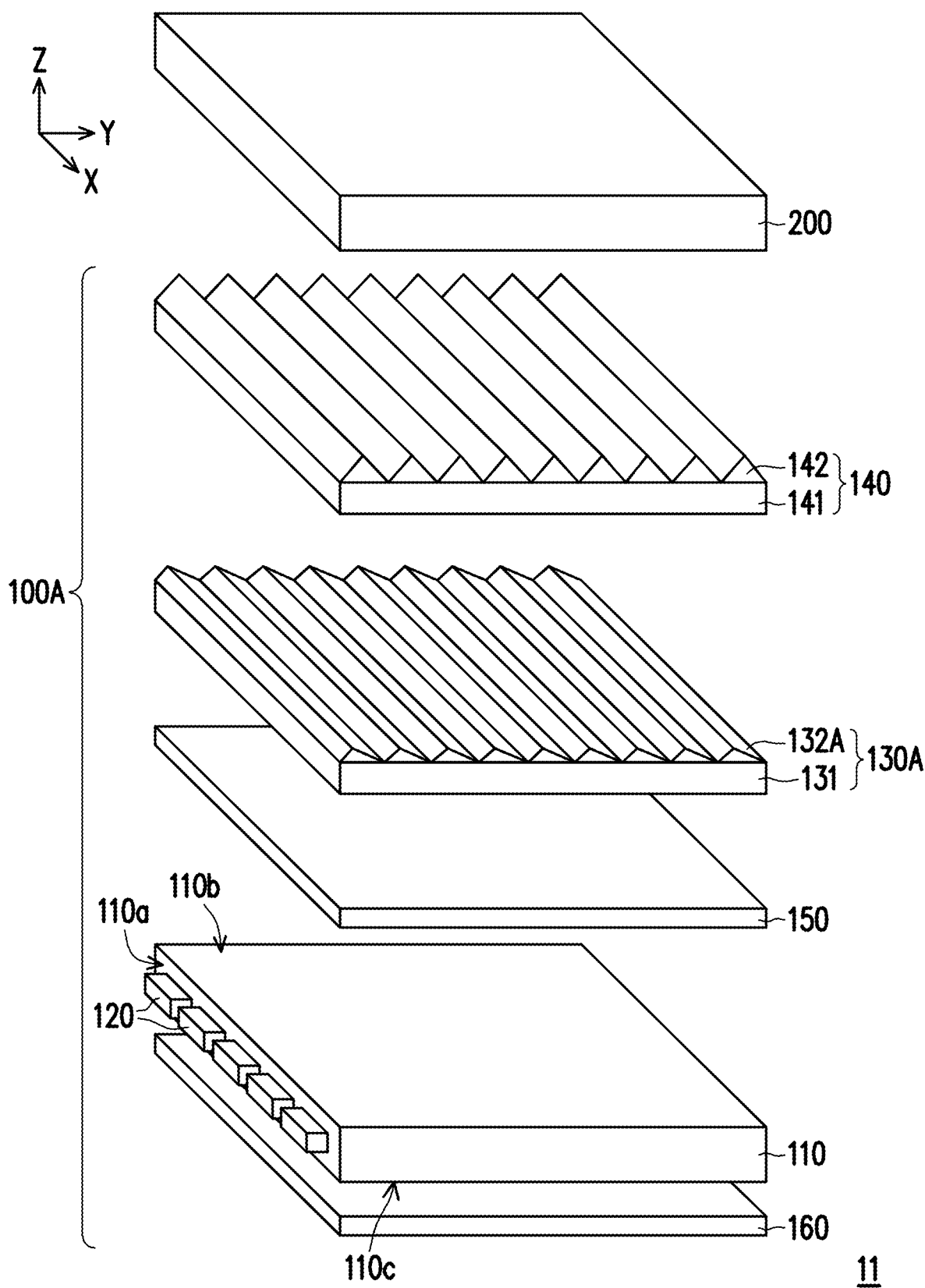
FIG. 5 is a schematic view of a display apparatus according to a second embodiment of the disclosure.
Figure 6:
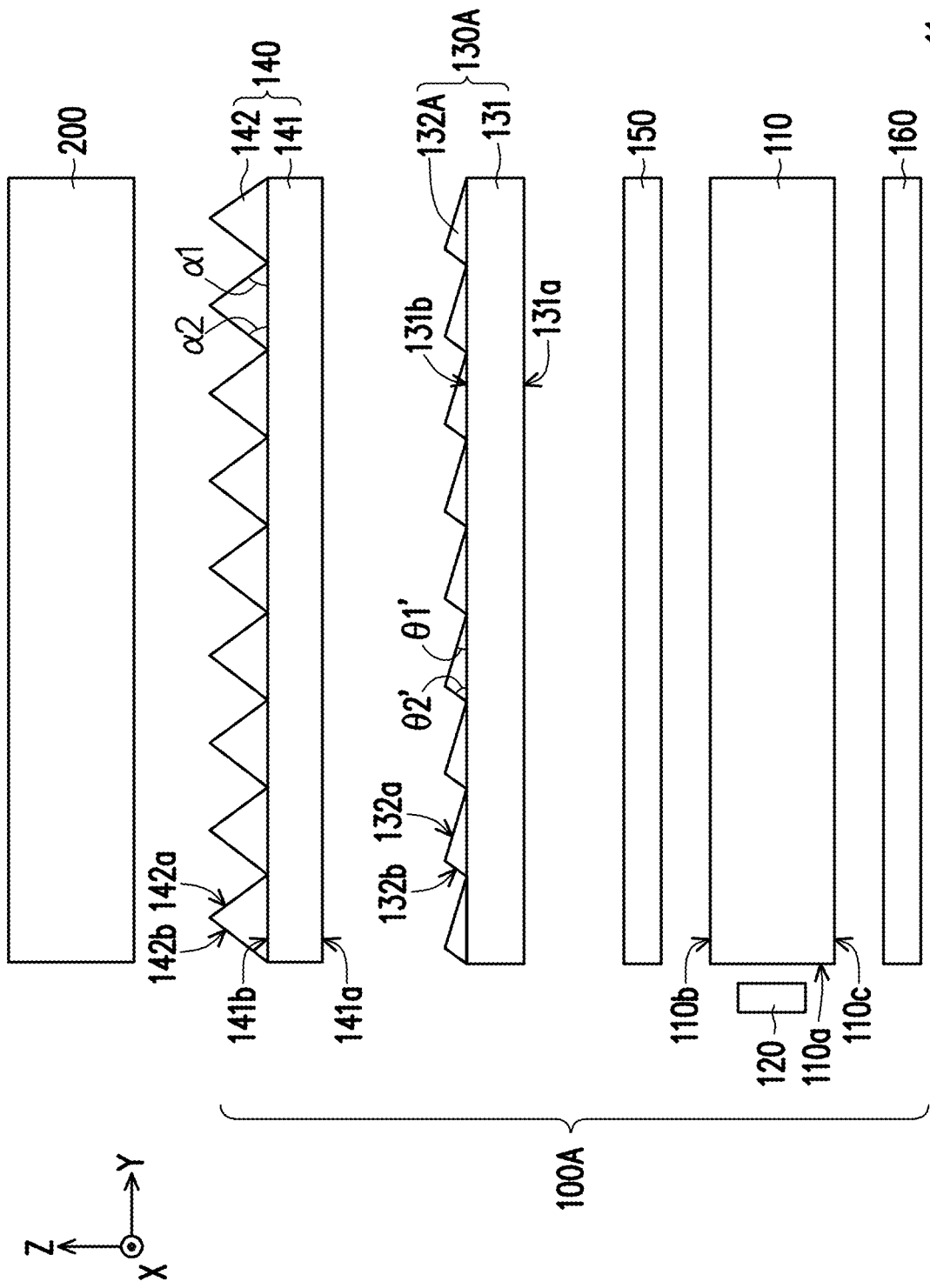
FIG. 6 is a schematic side view of the display apparatus of FIG. 5.

FIG. 5 is a schematic view of a display apparatus according to a second embodiment of the disclosure. FIG. 6 is a schematic side view of the display apparatus of FIG. 5. With reference to FIG. 5 and FIG. 6, the difference between a display apparatus 11 of this embodiment and the display apparatus 10 of FIG. 1 lies in the formation of the optical microstructures of the optical film. Specifically, in an optical microstructure 132A of an optical film 130A of this embodiment, an angle θ1' between the surface 132a and the second surface 131b is selectively less than an angle θ2' between the surface 132b and the second surface 131b. In other words, the angle θ1' between the surface 132a and the second surface 131b is different from the angle θ2' between the surface 132b and the second surface 131b. Therefore, contour of a cross section of the optical microstructure 132A of the optical film 130A is a non-equilateral triangle, but the disclosure is not limited thereto. It is worth noting that, with the angle θ1' of the optical microstructure 132A being less than the angle θ2', the surface area of the surface 132a of the optical microstructure 132A can be increased. Accordingly, the likelihood that the light beam from the light guide plate 110 is incident into the prism sheet 140 at an appropriate angle can be increased, to prevent the light beam from being reflected by the prism sheet 140 back into the light guide plate 110, helping to increase the light collection of a backlight module 100A.

Figure 7:
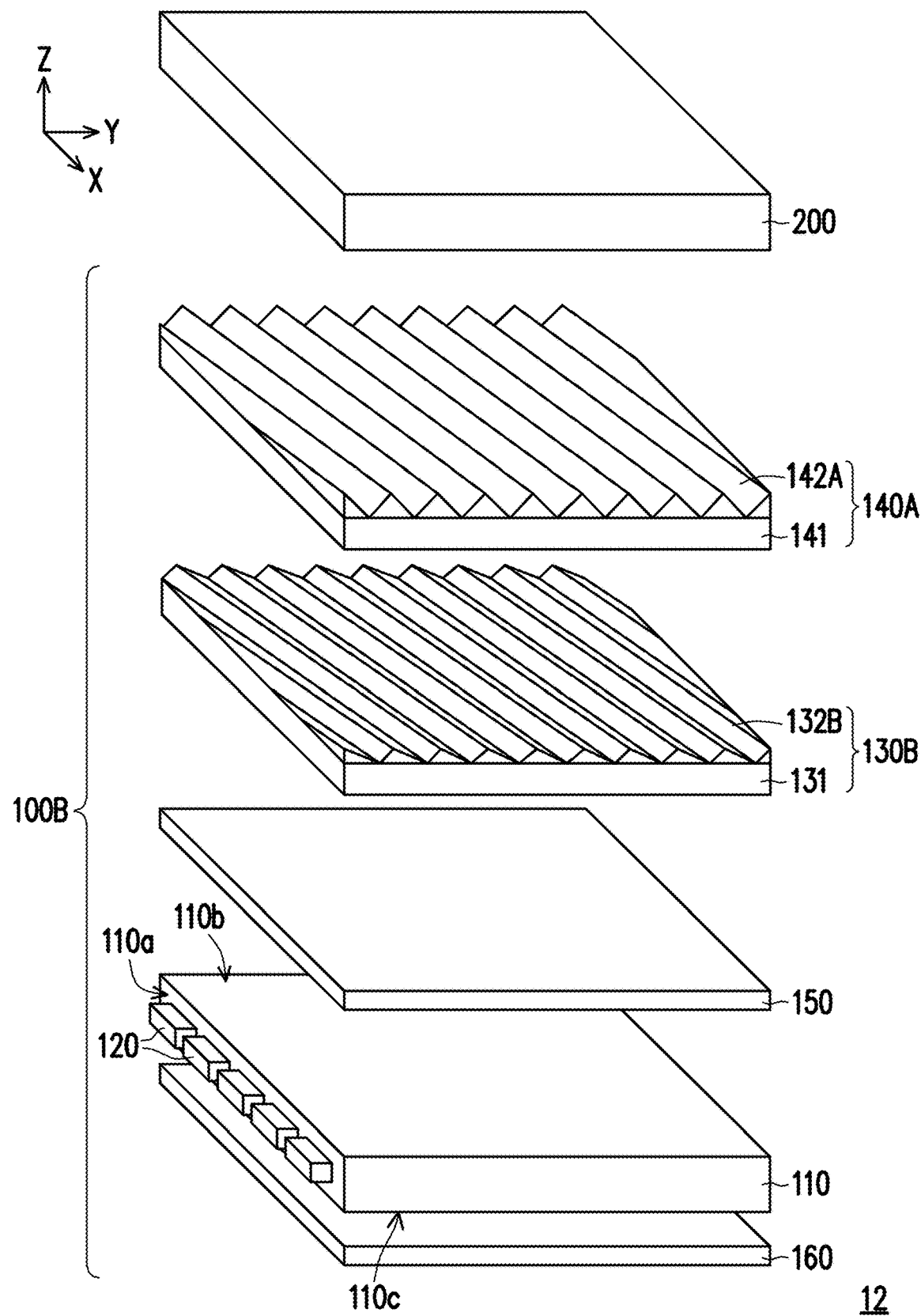
FIG. 7 is a schematic view of a display apparatus according to a third embodiment of the disclosure.
Figure 8:
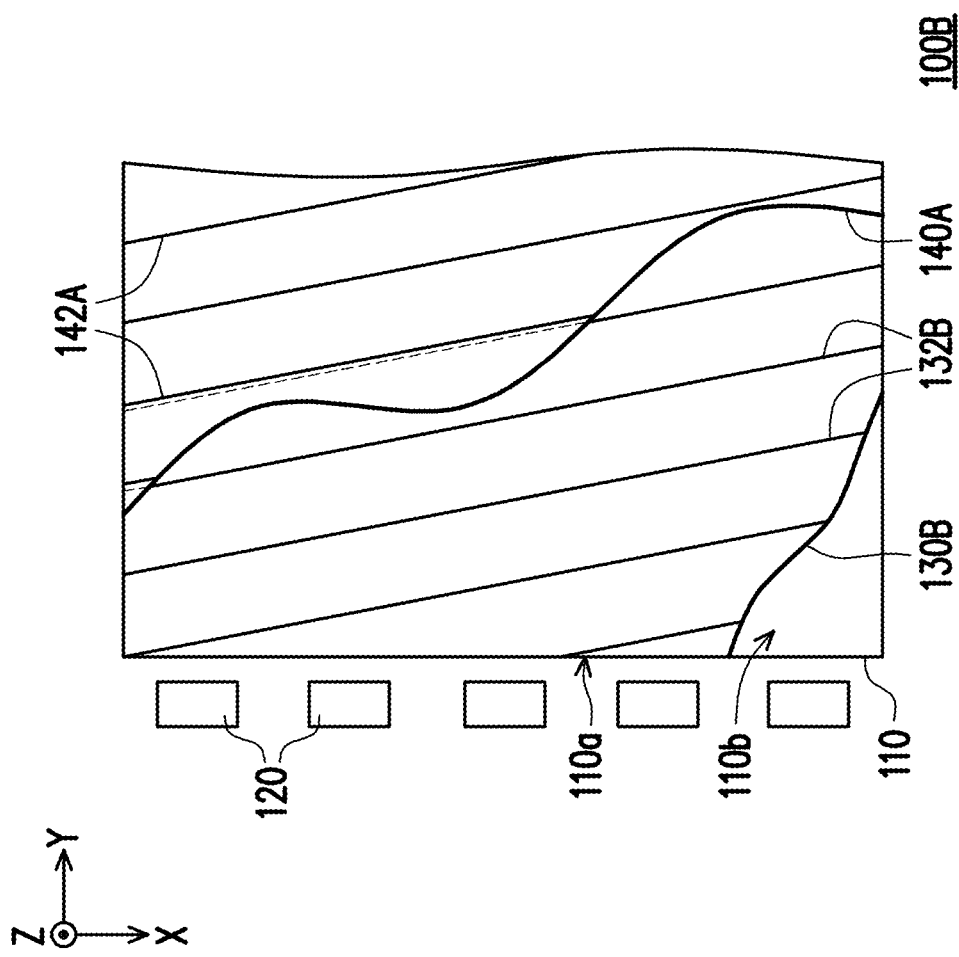
FIG. 8 is a schematic top view of the backlight module of FIG. 7.

FIG. 7 is a schematic view of a display apparatus according to a third embodiment of the disclosure. FIG. 8 is a schematic top view of the backlight module of FIG. 7. With reference to FIG. 7 and FIG. 8, the difference between a display apparatus 12 of this embodiment and the display apparatus 11 of FIG. 5 lies only in the configuration of the extension direction of the prism structures of the prism sheet and the extension direction of the optical microstructures of the optical film.

Specifically, in a backlight module 100B of this embodiment, an extension direction of prism structures 142A of a prism sheet 140A is neither parallel nor perpendicular to the light incident surface 110a of the light guide plate 110. That is, the extension direction of the prism structures 142A of the prism sheet 140A intersects the light incident surface 110a of the light guide plate 110, but the disclosure is not limited thereto. In this embodiment, the angle between the extension direction of the prism structures 142A of the prism sheet 140A and the light incident surface 110a of the light guide plate 110 may be less than or equal to 30 degrees.

On the other hand, the angle between an extension direction of optical microstructures 132B of an optical film 130B of this embodiment and the light incident surface 110a of the light guide plate 110 may be less than or equal to 30 degrees. In this embodiment, the extension direction of the optical microstructures 132B of the optical film 130B is selectively parallel to the extension direction of the prism structures 142A of the prism sheet 140A. Accordingly, the light collection of the backlight module 100B in a direction perpendicular to the extension direction of the prism structures 142A of the prism sheet 140A is greater than the light collection of the backlight module 100B in a direction parallel to the extension direction of the prism structures 142A of the prism sheet 140A. Nonetheless, the disclosure is not limited thereto. In other embodiments, the angle between the extension direction of the optical microstructures of the optical film and the extension direction of the prism structures of the prism sheet may be greater than 0 degrees and less than or equal to 30 degrees.

Figure 9:
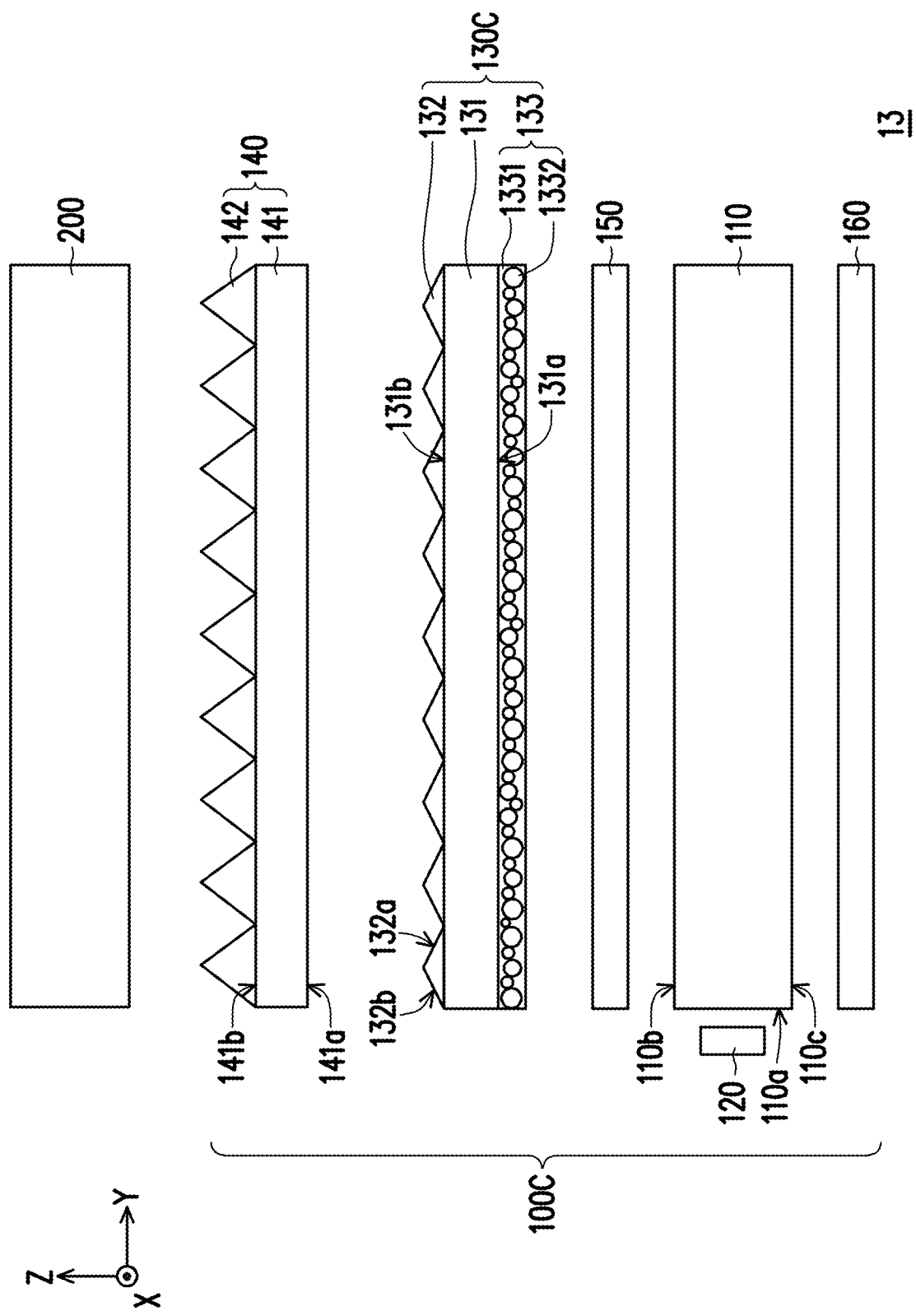
FIG. 9 is a schematic side view of a display apparatus according to a fourth embodiment of the disclosure.

FIG. 9 is a schematic side view of a display apparatus according to a fourth embodiment of the disclosure. With reference to FIG. 9, the difference between a display apparatus 13 of this embodiment and the display apparatus 10 of FIG. 1 lies in the composition of the optical film. Specifically, in a backlight module 100C of the display apparatus 13, a diffusion structure layer 133 is disposed on the first surface 131a of the substrate 131 of an optical film 130C.

For example, the diffusion structure layer 133 may include a photosensitive adhesive layer 1331 and a plurality of diffusion particles 1332 covered by the photosensitive adhesive layer 1331. In this embodiment, the material of the photosensitive adhesive layer 1331 is, for example, UV glue or other suitable transparent photosensitive adhesive materials. The material of the diffusion particles 1332 may include polymethyl methacrylate (PMMA), polystyrene (PS), or a copolymer of the above materials. On the other hand, in this embodiment, the plurality of diffusion particles 1332 of the diffusion structure layer 133 may have each a spherical shape and may have multiple particle sizes, but the disclosure is not limited thereto. In other embodiments, the plurality of diffusion particles 1332 may also have substantially the same particle size.

It is worth mentioning that, with the diffusion structure layer 133 disposed on the first surface 131a of the optical film 130C, the optical film 130C can have a specific haze value. For example, the haze value of the diffusion structure layer 133 (or the optical film 130C) may be between 20% and 90%. Accordingly, the concealing ability of the backlight module 100C can be improved, and the assembly yield of the backlight module 100C can be increased. In other words, the process latitude of each component of the backlight module 100C can also be increased. Since the diffusion structure layer 133 of the optical film 130C has a specific haze value, it is possible that the backlight module 100C does not have the diffuser 150.

Figure 10:
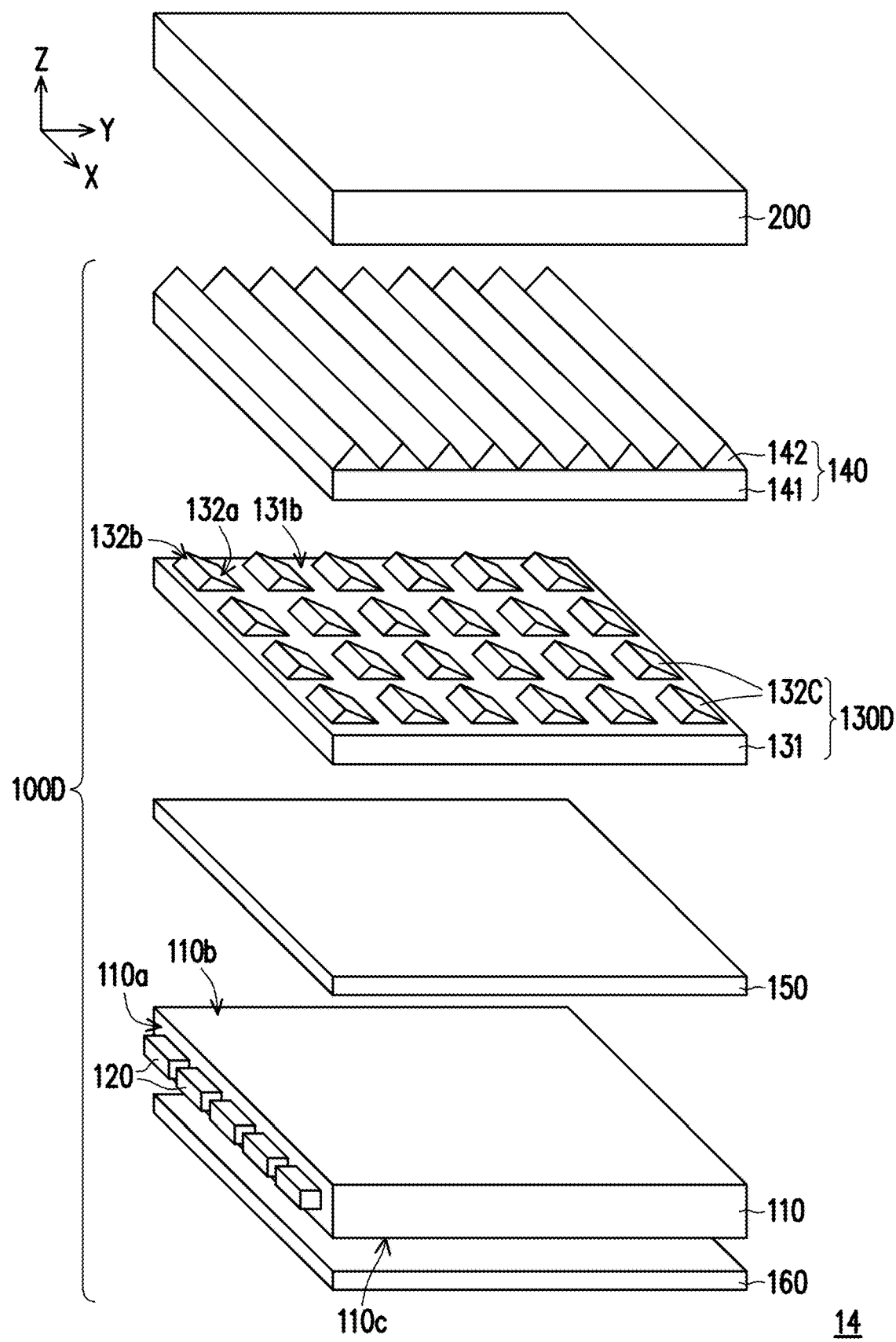
FIG. 10 is a schematic view of a display apparatus according to a fifth embodiment of the disclosure.

FIG. 10 is a schematic view of a display apparatus according to a fifth embodiment of the disclosure. With reference to FIG. 10, the difference between a display apparatus 14 of this embodiment and the display apparatus 11 of FIG. 5 lies only in the configuration of the optical microstructures of the optical film. In an optical film 130D of a backlight module 100D of this embodiment, a plurality of optical microstructures 132C may be separately disposed on the second surface 131b of the substrate 131. For example, the optical microstructures 132C may be arranged into multiple columns and rows respectively in direction X and direction Y (i.e., the optical microstructures 132C may be arranged into an array on the substrate 131), while an extension direction of the optical microstructures 132C is still substantially parallel to the extension direction of the prism structures 142 of the prism sheet 140. Since the configuration of the surface 132a and the surface 132b of each optical microstructure 132C is similar to that of the optical microstructure 132A of FIG. 5, reference may be made to the relevant paragraphs of the above embodiment for the detailed description, which will not be repeated herein.

Figure 11:
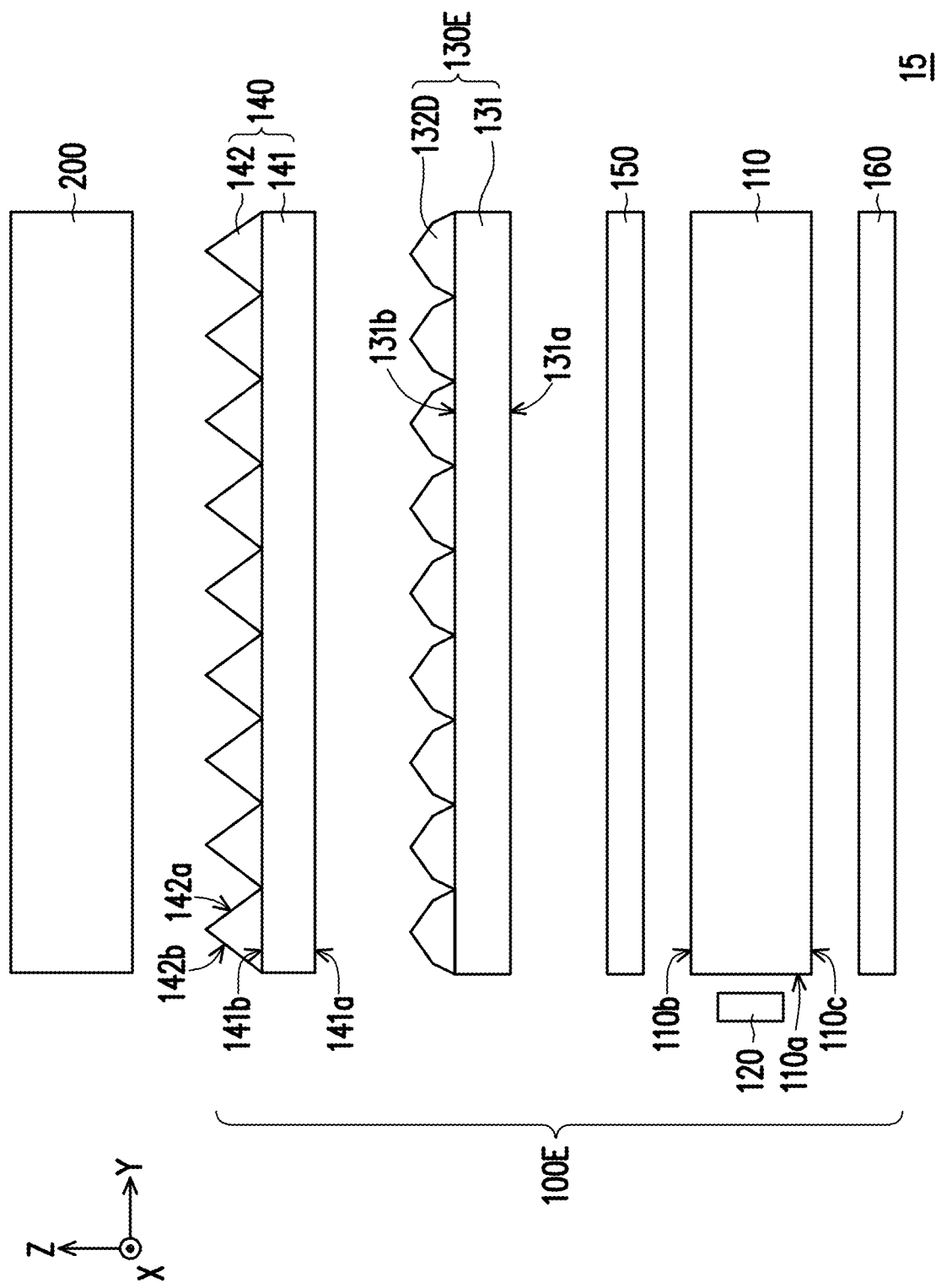
FIG. 11 is a schematic side view of a display apparatus according to a sixth embodiment of the disclosure.
Figure 12:
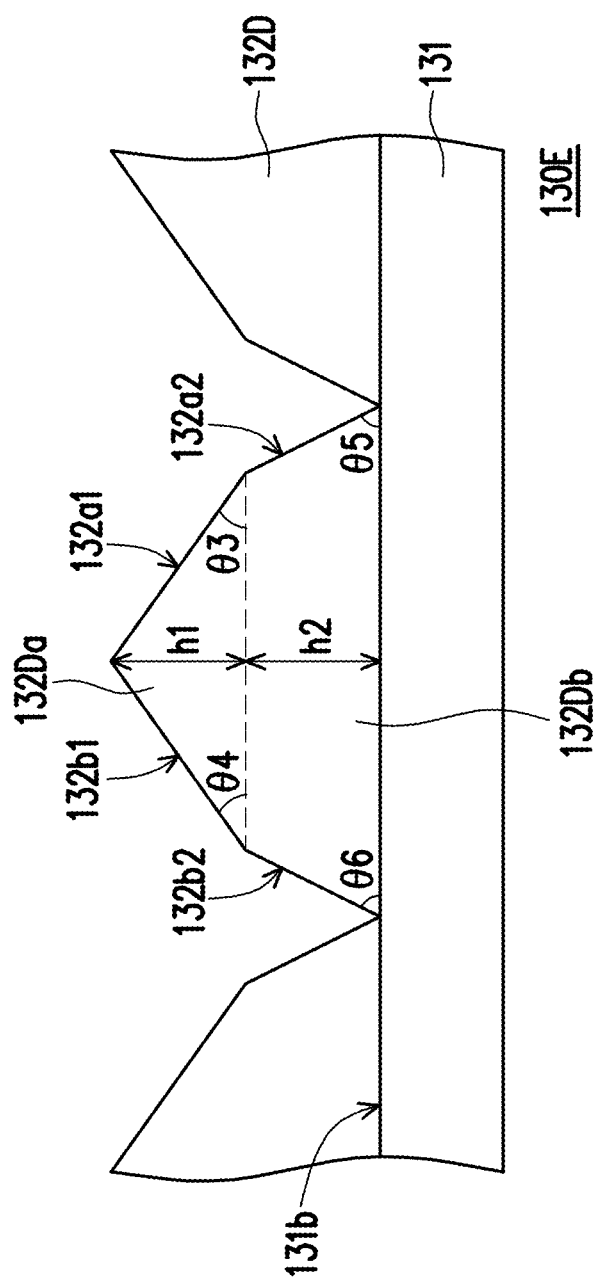
FIG. 12 is a schematic partially enlarged view of the optical film of FIG. 11.

FIG. 11 is a schematic side view of a display apparatus according to a sixth embodiment of the disclosure. FIG. 12 is a schematic partially enlarged view of the optical film of FIG. 11. With reference to FIG. 11 and FIG. 12, the difference between a display apparatus 15 of this embodiment and the display apparatus 10 of FIG. 2 lies in the formation of the optical microstructures of the optical film. In a backlight module 100E of this embodiment, contour of a cross section (e.g., on the YZ plane) of an optical film 130E has, for example, a pentagonal shape.

For example, an optical microstructure 132D of this embodiment has a surface 132a1 and a surface 132a2 being relatively away from the light incident surface 110a of the light guide plate 110 and a surface 132b1 and a surface 132b2 being relatively close to the light incident surface 110a of the light guide plate 110. The two ends of the surface 132a2 are respectively connected to the surface 132a1 and the second surface 131b of the substrate 131. The two ends of the surface 132b2 are respectively connected to the surface 132b1 and the second surface 131b of the substrate 131. The surface 132a1 is connected between the surface 132a2 and the surface 132b1. The surface 132b1 is connected between the surface 132a1 and the surface 132b2. Notably, the inclination degrees of the two surfaces 132a1, 132a2 relative to the second surface 131b of the substrate 131 are different from each other; similarly, the inclination degrees of the two surfaces 132b1, 132b2 relative to the second surface 131b of the substrate 131 are also different from each other.

In the optical microstructure 132D of this embodiment, an angle θ3, an angle θ4, an angle θ5, and an angle θ6 are present between the second surface 131b of the substrate 131 and respectively the surface 132a1, the surface 132b1, the surface 132a2, and the surface 132b2. With the angle θ5 between the surface 132a2 of the optical microstructure 132D and the second surface 131b being less than 35 degrees and greater than 0 degrees, the light beam from the light guide plate 110 can be incident into the prism sheet 140 at an appropriate angle to prevent the light beam from being reflected by the prism sheet 140 back into the light guide plate 110, helping to increase the light collection of the backlight module 100E. Notably, in the optical microstructure 132D, with the angle θ3 between the surface 132a1 and the second surface 131b being less than the angle θ5 between the surface 132a2 and the second surface 131b, the light collection can be increased while the viewing angle standard of the backlight module 100E is maintained.

For example, in the optical microstructure 132D of this embodiment, the angle θ3 of the surface 132a1 is substantially equal to the angle θ4 of the surface 132b1, and the angle θ5 of the surface 132a2 is substantially equal to the angle θ6 of the surface 132b2, but the disclosure is not limited thereto. In the optical microstructure 132D of other embodiments, it is also possible that the angle θ3 of the surface 132a1 is not equal to the angle θ4 of the surface 132b1, and the angle θ5 of the surface 132a2 is not equal to the angle θ6 of the surface 132b2, as long as these angles of the optical microstructure are each less than the angle α1 of the surface 142a and the angle α2 of the surface 142b of the prism structure 142.

On the other hand, the optical microstructure 132D may be divided into two portions connected to each other, respectively a first portion 132Da defined by the surface 132a1 and the surface 132b1 and a second portion 132Db defined by the surface 132a2 and the surface 132b2. The first portion 132Da and the second portion 132Db respectively have a first height h1 and a second height h2 in the normal direction (e.g., direction Z) of the second surface 131b of the substrate 131. In the optical microstructure 132D of this embodiment, the first height h1 of the first portion 132Da is less than the second height h2 of the second portion 132Db.

Figure 13:
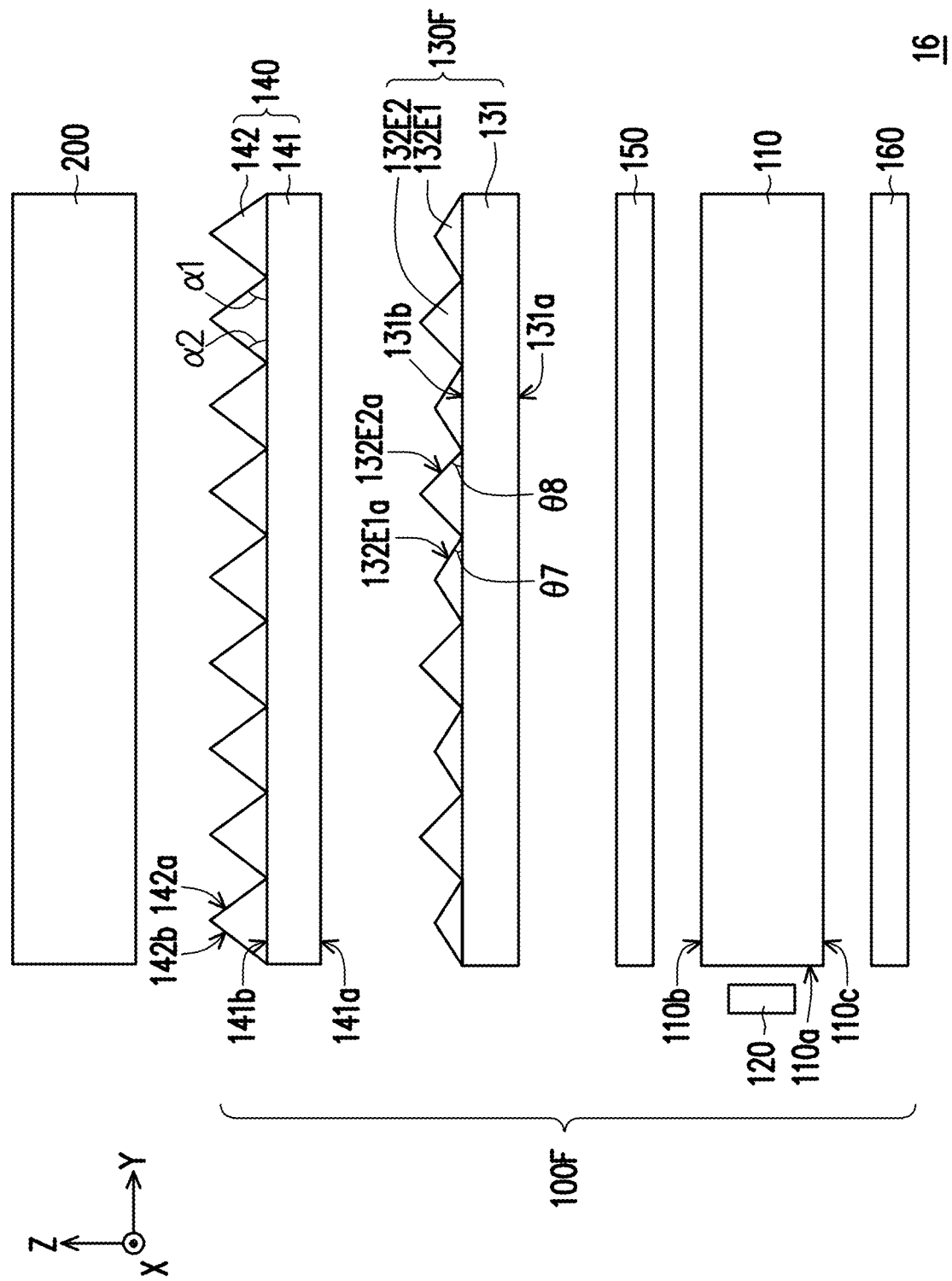
FIG. 13 is a schematic side view of a display apparatus according to a seventh embodiment of the disclosure.

FIG. 13 is a schematic side view of a display apparatus according to a seventh embodiment of the disclosure. With reference to FIG. 13, the difference between a display apparatus 16 of this embodiment and the display apparatus 10 of FIG. 2 lies in the formation of the optical microstructures of the optical film. Specifically, in an optical film 130F of a backlight module 100F, the light receiving surfaces of the optical microstructures have two inclination degrees relative to the second surface 131b of the substrate 131. For example, in this embodiment, the optical film 130F has a plurality of optical microstructures 132E1 and a plurality of optical microstructures 132E2 alternately arranged in direction Y. An angle θ7 and an angle θ8 are present between the second surface 131b of the substrate 131 and respectively a surface 132E1a of each optical microstructure 132E1 and a surface 132E2a of each optical microstructure 132E2. With the angle θ7 of the surface 132E1a of the optical microstructure 132E1 being different from the angle θ8 of the surface 132E2a of the optical microstructure 132E2, the light collection of the backlight module 100F can be increased while the viewing angle standard of the display apparatus 16 can be maintained.

In summary of the foregoing, in the backlight module according to an embodiment of the disclosure, the optical film is disposed between the prism sheet and the light guide plate. The angle between the light receiving surface of the optical microstructure of the optical film and the surface of the first substrate is different from the angle between the light receiving surface of the prism structure of the prism sheet and the surface of the second substrate. Accordingly, the light collection of the backlight module in the direction perpendicular to the light incident surface of the light guide plate can be increased, and the viewing angle range of the display apparatus in the extension direction of the optical microstructures can be increased.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A backlight module, comprising a light guide plate, a light source, an optical film, and a prism sheet, wherein
the light guide plate has a light incident surface and a light emitting surface connected to the light incident surface;
the light source is disposed on a side of the light incident surface of the light guide plate;
the optical film is overlapped with the light emitting surface of the light guide plate, and comprises a first substrate and a plurality of optical microstructures, wherein
the first substrate has a first surface and a second surface opposite to each other, wherein the first surface faces the light emitting surface of the light guide plate; and
the plurality of optical microstructures are disposed on the second surface of the first substrate, an extension direction of the plurality of optical microstructures is parallel to the light incident surface of the light guide plate, and each of the plurality of optical microstructures has a fifth surface away from the light incident surface, wherein a first angle is present between the fifth surface and the second surface; and
the prism sheet is overlapped with the optical film, is located on a side of the second surface of the first substrate, and comprises a second substrate and a plurality of prism structures, wherein
the second substrate has a third surface and a fourth surface opposite to each other, wherein the third surface faces the optical film; and
the plurality of prism structures are disposed on the fourth surface of the second substrate, an extension direction of the plurality of prism structures is parallel to the light incident surface of the light guide plate, and each of the plurality of prism structures has a sixth surface away from the light incident surface, wherein a second angle is present between the sixth surface and the fourth surface, the second angle is different from the first angle, and the first angle is less than 35 degrees and greater than 0 degrees.

2. The backlight module according to claim 1, wherein the first angle is less than the second angle.

3. The backlight module according to claim 1, wherein each of the plurality of optical microstructures further has an eighth surface close to the light incident surface, a third angle is present between the shady surface and the second surface, and the third angle is different from the first angle.

4. The backlight module according to claim 1, further comprising:
a diffuser, overlapped with the optical film and located between the optical film and the light guide plate.

5. The backlight module according to claim 1, wherein a diffusion structure layer is disposed on the first surface of the optical film.

6. The backlight module according to claim 1, wherein an included angle between the extension direction of the plurality of optical microstructures and the light incident surface of the light guide plate is less than or equal to 30 degrees.

7. The backlight module according to claim 1, wherein an included angle between the extension direction of the plurality of prism structures and the light incident surface of the light guide plate is less than or equal to 30 degrees.

8. The backlight module according to claim 1, wherein the extension direction of the plurality of optical microstructures is parallel to the extension direction of the plurality of prism structures.

9. A backlight module, comprising a light guide plate, a light source, an optical film, and a prism sheet, wherein
the light guide plate has a light incident surface and a light emitting surface connected to the light incident surface;
the light source is disposed on a side of the light incident surface of the light guide plate;
the optical film is overlapped with the light emitting surface of the light guide plate, and comprises a first substrate and a plurality of optical microstructures, wherein
the first substrate has a first surface and a second surface opposite to each other, wherein the first surface faces the light emitting surface of the light guide plate; and
the plurality of optical microstructures are disposed on the second surface of the first substrate, and each of the plurality of optical microstructures has a fifth surface away from the light incident surface, wherein a first angle is present between the fifth surface and the second surface; and
the prism sheet is overlapped with the optical film, is located on a side of the second surface of the first substrate, and comprises a second substrate and a plurality of prism structures, wherein
the second substrate has a third surface and a fourth surface opposite to each other, wherein the third surface faces the optical film; and
the plurality of prism structures are disposed on the fourth surface of the second substrate, and each of the plurality of prism structures has a sixth surface away from the light incident surface, wherein a second angle is present between the sixth surface and the fourth surface, and the second angle is different from the first angle,
wherein each of the plurality of optical microstructures further has a seventh surface, the seventh surface is away from the light incident surface and connected between the fifth surface and the second surface, a third angle is present between the seventh surface and the second surface, and the third angle is greater than the first angle and less than the second angle.

10. The backlight module according to claim 9, wherein the third angle is less than 35 degrees and greater than 0 degrees.

11. The backlight module according to claim 9, wherein each of the plurality of optical microstructures further has an eighth surface and a ninth surface close to the light incident surface, the fifth surface and the eighth surface define a first portion of each of the plurality of optical microstructures, the seventh surface and the ninth surface define a second portion of each of the plurality of optical microstructures, the first portion and the second portion respectively have a first height and a second height in a normal direction of the second surface, and the first height is less than the second height.

12. The backlight module according to claim 1, wherein the plurality of optical microstructures comprise a plurality of first optical microstructures and a plurality of second optical microstructures, and the first angle of each of the plurality of first optical microstructures is different from the first angle of each of the plurality of second optical microstructures.

13. A display apparatus, comprising a backlight module and a display panel, wherein
the backlight module comprises a light guide plate, a light source, an optical film, and a prism sheet, wherein
the light guide plate has a light incident surface and a light emitting surface connected to the light incident surface;
the light source is disposed on a side of the light incident surface of the light guide plate;
the optical film is overlapped with the light emitting surface of the light guide plate, and comprises a first substrate and a plurality of optical microstructures, wherein
the first substrate has a first surface and a second surface opposite to each other, wherein the first surface faces the light emitting surface of the light guide plate; and
the plurality of optical microstructures are disposed on the second surface of the first substrate, an extension direction of the plurality of optical microstructures is parallel to the light incident surface of the light guide plate, and each of the plurality of optical microstructures has a fifth surface away from the light incident surface, wherein a first angle is present between the fifth surface and the second surface; and
the prism sheet is overlapped with the optical film, is located on a side of the second surface of the first substrate, and comprises a second substrate and a plurality of prism structures, wherein
the second substrate has a third surface and a fourth surface opposite to each other, wherein the third surface faces the optical film; and
the plurality of prism structures are disposed on the fourth surface of the second substrate, an extension direction of the plurality of prism structures is parallel to the light incident surface of the light guide plate, and each of the plurality of prism structures has a seventh surface away from the light incident surface, wherein a second angle is present between the seventh surface and the fourth surface, the second angle is different from the first angle, and the first angle is less than 35 degrees and greater than 0 degrees; and
the display panel is overlapped with the light emitting surface of the light guide plate, and is located on a side of the fourth surface of the prism sheet.

14. The display apparatus according to claim 13, wherein a diffusion structure layer is disposed on the first surface of the optical film.

15. The display apparatus according to claim 13, further comprising:

a diffuser, overlapped with the optical film and located between the optical film and the light guide plate.

16. A display apparatus, comprising a backlight module and a display panel, wherein the backlight module comprises a light guide plate, a light source, an optical film, and a prism sheet, wherein the light guide plate has a light incident surface and a light emitting surface connected to the light incident surface;

the light source is disposed on a side of the light incident surface of the light guide plate;

the optical film is overlapped with the light emitting surface of the light guide plate, and comprises a first substrate and a plurality of optical microstructures, wherein the first substrate has a first surface and a second surface opposite to each other, wherein the first surface faces the light emitting surface of the light guide plate; and the plurality of optical microstructures are disposed on the second surface of the first substrate, and each of the plurality of optical microstructures has a fifth surface away from the light incident surface, wherein a first angle is present between the fifth surface and the second surface; and the prism sheet is overlapped with the optical film, is located on a side of the second surface of the first substrate, and comprises a second substrate and a plurality of prism structures, wherein the second substrate has a third surface and a fourth surface opposite to each other, wherein the third surface faces the optical film; and the plurality of prism structures are disposed on the fourth surface of the second substrate, and each of the plurality of prism structures has a sixth surface away from the light incident surface, wherein a second angle is present between the sixth surface and the fourth surface, and the second angle is different from the first angle; and the display panel is overlapped with the light emitting surface of the light guide plate, and is located on a side of the fourth surface of the prism sheet, wherein each of the plurality of optical microstructures further has a seventh surface, the seventh surface is away from the light incident surface and connected between the fifth surface and the second surface, a third angle is present between the seventh surface and the second surface, and the third angle is greater than the first angle and less than the second angle.

17. The display apparatus according to claim 16, wherein the third angle is less than 35 degrees and greater than 0 degrees.

18. The display apparatus according to claim 16, wherein each of the plurality of optical microstructures further has an eighth surface and a ninth surface close to the light incident surface, the fifth surface and the eighth surface define a first portion of each of the plurality of optical microstructures, the seventh surface and the ninth surface define a second portion of each of the plurality of optical microstructures, the first portion and the second portion respectively have a first height and a second height in a normal direction of the second surface, and the first height is less than the second height.

19. The display apparatus according to claim 13, wherein the plurality of optical microstructures comprise a plurality of first optical microstructures and a plurality of second optical microstructures, and the first angle of each of the plurality of first optical microstructures is different from the first angle of each of the plurality of second optical microstructures.

* * * * *